United States Patent [19]

Ward et al.

[11] Patent Number: 4,849,041
[45] Date of Patent: Jul. 18, 1989

[54] METHOD OF FORMING A PLUNGER FOR A CHECK VALVE

[76] Inventors: Erin C. Ward, 292 Grayhaber Rd., Tolland, Conn. 06084; Charles D. Ward, 10 Irene Dr., Vernon, Conn. 06066

[21] Appl. No.: 159,770

[22] Filed: Feb. 24, 1988

Related U.S. Application Data

[62] Division of Ser. No. 37,687, Apr. 13, 1987.

[51] Int. Cl.⁴ .............................................. F16K 15/02
[52] U.S. Cl. .................................. 156/213; 29/157.1 A; 29/525; 156/245; 156/293
[58] Field of Search ................ 156/213, 309.6, 380.8, 156/292, 293, 245; 29/156.7 A, 156.7 B, 157.1 A, 525; 264/127, 274; 428/71; 24/90 HA, 92; 251/368, 356; 137/542, 543, 375

[56] References Cited

U.S. PATENT DOCUMENTS

| | | | |
|---|---|---|---|
| 1,352,735 | 9/1920 | Egerton | 251/368 |
| 2,301,276 | 1/1941 | Gussick | 251/361 |
| 2,443,012 | 6/1948 | Pope | 251/356 |
| 2,888,238 | 5/1959 | Leathers et al. | 137/543.23 |
| 3,006,597 | 10/1961 | Hookway | 251/327 |
| 3,425,444 | 2/1969 | Jones | 251/368 |
| 3,438,391 | 4/1969 | Yocum | 251/368 |
| 3,498,319 | 3/1970 | Schnabel | 137/375 |
| 3,531,086 | 9/1968 | Shannon | 251/356 |
| 3,589,677 | 6/1971 | Segers | 251/368 |
| 4,129,144 | 12/1978 | Andersson et al. | 137/543.21 |
| 4,133,614 | 1/1979 | Baginski et al. | 29/525 |
| 4,133,927 | 1/1979 | Tomoda | 156/242 |
| 4,572,233 | 2/1986 | Weeder | 137/375 |

FOREIGN PATENT DOCUMENTS 0207006  3/1956  Australia .............................. 251/356

*Primary Examiner*—Michael W. Ball
*Assistant Examiner*—Steven D. Maki
*Attorney, Agent, or Firm*—Chilton, Alix & Van Kirk

[57] ABSTRACT

A plunger for a check valve and a method for constructing such a plunger. The preferred plunger has a shell of P.T.F.E. sealingly secured to a rigid, metal disk. The cavity between the shell and the disk is filled with a silicone rubber material which, together with the shell, provides a resiliency that enables the shell to conform to irregularities in its mating valve seat even when the seating pressure is low. The shell preferably has an outwardly bowed, tapered sidewall for providing a circumferential line contact with a frustoconical valve seat. In accordance with the method, the shell begins as a sheet that is hot molded around the pre-formed rubber silicone, and the outer edge of the shell is inserted into a groove in the disk to envelope the filler material. The outer diameter of the disk is reduced to sealingly capture the shell edge, thereby forming a unitary structure.

4 Claims, 2 Drawing Sheets

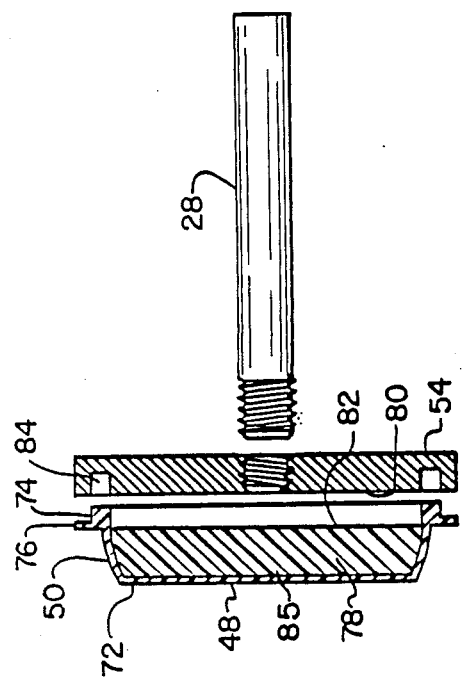
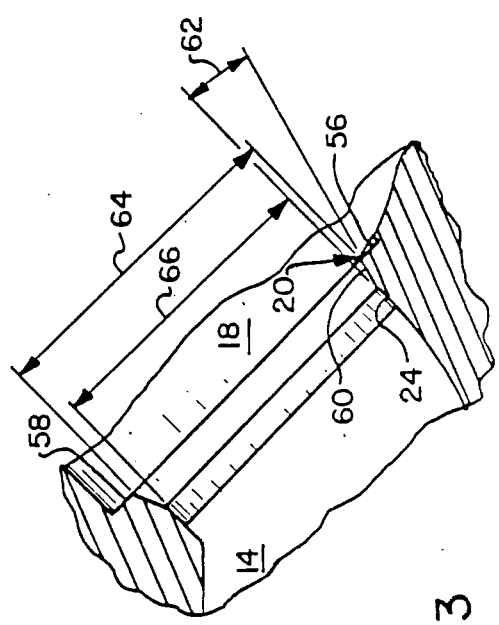
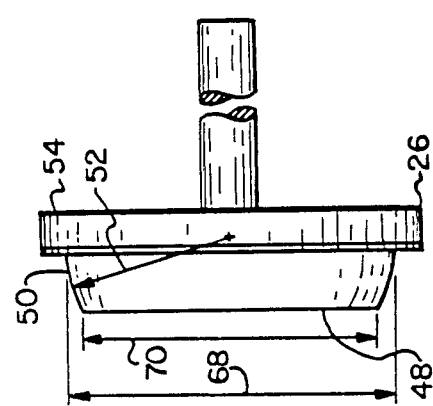
Fig. 4
Fig. 3
Fig. 2

METHOD OF FORMING A PLUNGER FOR A CHECK VALVE

This is a divisional of co-pending application Ser. No. 037,687 filed on 04/13/87.

BACKGROUND OF THE INVENTION

The present invention relates to flow control devices and, particularly, to valves of the type generally known as "soft" seated check valves. More specifically, this invention is directed to enhancing the performance of check valves, especially at low back pressure and in corrosive environments, and to a method of fabricating a corrosion resistant check valve characterized by such enhanced performance.

Soft seated check valves are generally of two types, ball cone and tapered plug. Although conventional valves of these types can be effective in checking the reverse flow of fluid though a line, their performance under low back pressure has often been unsatisfactory. The ball in the ball type valve is porous, and the mounting and operating characteristics are somewhat complicated, so that such valves are not easy to repair while in line. The tapered plug valves are typically of simpler design and more readily accessible for repair, but these types, even when new, have difficulty providing a good seal at low back pressure.

An exemplary prior art tapered plug check valve is disclosed in U.S. Pat. No. 3,677,286, in which a valve chamber is located between an inlet channel and an outlet channel, and a valve seat is located between the inlet channel and the valve chamber. A valve plug or plunger is supported in registration with the valve seat for engagement thereof when the fluid pressure in the chamber exceeds the pressure in the inlet channel. The sealing effect is accomplished by the mating of two tapered surfaces in a wedge-like action. At low seating pressure, the wedge-type interaction between the valve seat is applied over a relatively large contact area and a full circumferential seal cannot be assured. At very high back seating pressure, the molded valve seat disclosed in the referenced patent is subject to being pushed through the passageway between the chamber and the inlet channel, thereby destroying the seal and resulting in valve failure.

SUMMARY OF THE INVENTION

The present invention overcomes the above-mentioned and other deficiencies in conventional soft seated check valves, by the use of a composite valve plunger or plug which interacts with the valve seat in a manner that achieves satisfactory sealing over a wide range of reverse flow pressures.

In one embodiment, the invention is directed to a valve having a body portion including an inlet channel, an outlet channel and a chamber fluidly connected therebetween, with a valve seat and associated flow passage located between the inlet channel and the chamber. The valve seat has an upper, flat rim portion and an inwardly tapered portion extending from the flat rim into the flow passage. A valve member having a composite head or plunger is supported so as to establish, in the closed position and even at low back pressure, a line contact seal between the front portion of the plunger and the tapered portion of the valve seat. This line contact seal results from the shape and material properties of the plunger.

The plunger includes a thin frontal shell of a corrosion resistant, pliable material such as polytetraflorethylene ("Teflon"), hereinafter P.T.F.E., the shell being secured to a metal backing disk. The cavity formed between the hollow shell and the disk is filled with a relatively softer, resilient material such as silicone rubber. The shell sidewalls are preferably radiused as by the arc of a sphere or parabola to produced a slightly outwardly bowed profile such that initial contact between the shell and the tapered valve seat will be substantially a circumferential line contact, rather than a wedge-type circumferential surface contact. Particularly at low backseating pressures, the available sealing force is more effectively utilized in achieving the integrity of a line contact. The equivalent total force is dissipated over a larger surface in conventional tapered plug valves. Preferably, the disk portion of the plunger has an outer diameter sufficient to register with the flat rim portion of the valve seat and thereby prevent the plunger from blowing through the passageway at very high back pressures.

In the method embodiment of the invention, the plunger is constructed by forming a shell having a closed front and arcuate side portions, the shell including a generally circular projection at its rear portion. The shell is filled with a relatively softer, more resilient material, and a hard metal backing disk with a circular groove is force fit into tight engagement with the projections on the shell. This isolates the filler material from the environment and, preferably, provides a firm backing surface for the filler material.

The combination of a very soft plunger head and a rugged but smooth "Teflon" seating area insures reliable sealing junction with the valve seat. The design of the plunger head radius and the cooperating seat angle allow the plunger head to develop a continuous line contact with seat, thereby maximizing the effect of what little pressure may be available to push the plunger head against the seat insuring a good seal. As pressure builds, the plunger head is forced further into the seat until disk rests on top of the web in the valve body which defines the seat area, thus preventing further deformation of the plunger head and preventing blow through. The resiliency of the plunger allows the head to return to its proper shape when the plunger lifts off the seat during flow cycling. The plunger will crack open at minimal pressure because no real wedging action between the plunger and the seat occurs.

BRIEF DESCRIPTION OF THE DRAWINGS

The above-discusses and other objects and advantages of the invention may be better understood by reference to the accompanying description of the preferred embodiment and drawings, in which:

FIG. 2 is a side view of the valve plunger shown in FIG. 1;

FIG. 3 is an enlarged detail of the valve seat area of the valve shown in FIG. 1;

FIG. 4 is a section view of the valve plunger taken, along lines 4—4 of FIG. 2.

DESCRIPTION OF THE PREFERRED EMBODIMENT

Figure 1:
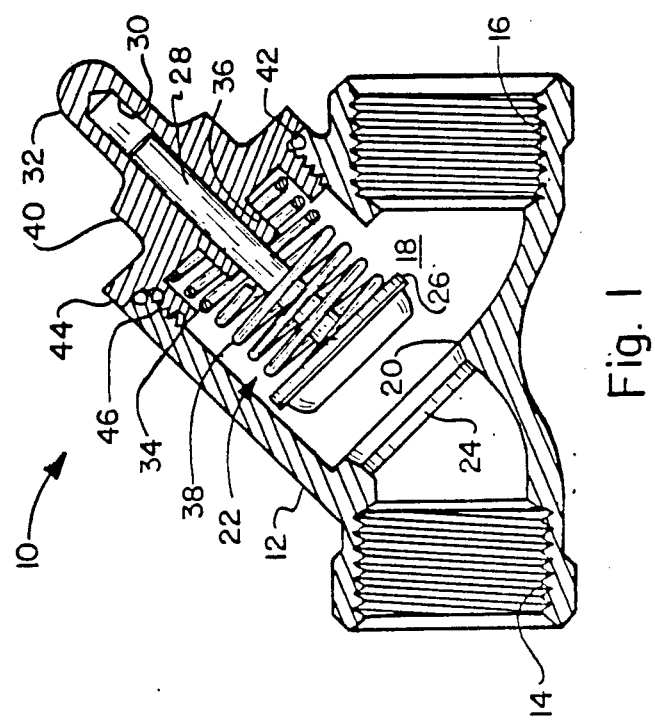
FIG. 1 is a section view of a check valve in accordance with the present invention.

FIG. 1 shows a check valve 10 according to the present invention having a generally "y" shaped body portion 12 defining an inlet channel 14 horizontally aligned with an outlet channel 16. A valve chamber 18 fluidly connects the channels 14 and 16, the chamber being oriented vertically obliquely relative to the horizontal. A valve seat structure 20 is formed in a body web portion between the inlet channel 14 and the chamber 18. A valve member 22 is supported in the chamber 18 for reciprocal movement toward and away from the valve seat 20. The valve seat 20 defines a flow passage 24 connecting the inlet channel 14 and the chamber 18. Upon the occurrence of a higher pressure in the chamber 18 than that in the inlet channel 14, the valve will be closed by the plunging action of the valve member 22 against the seat 20.

The valve member 22 includes a head portion 26 and a stem 28. The stem extends into a bore 30 formed in the valve cap 32. Valve cap 32 engages threads 34 formed the upper portion of the chamber 18. Preferably, a boss 36 is formed as an extension of the bore 30, such that a coil spring 38 can be interposed between the valve head 26 and the cap 32 to increase the responsiveness of the checking action of the valve when the particular nature of the service conditions so demands. The cap 32 preferable has an hexagonal portion 40 to facilitate the threading of the cap into the chamber, and a gasket 42 is preferable provided between the flange 44 of the cap and a seat or groove whereby the process fluid within the valve is prevented from leaking into the environment.

FIG. 2 illustrates the preferred shape of the valve head 26. The head has a leading plunger portion including a closed front portion 48 and arcuate side portion 50 for engaging the valve seat. The side portion 50 is radiused as shown at 52 to form an outwardly bowed profile. The plunger portion is backed by a metal disk 54. When viewed in the direction of flow the head is circular.

FIG. 3 shows the details of the preferred valve seat 20, including a flat rim portion 56 forming a part of the floor of the chamber 18 and an inwardly tapered portion 60 leading to the inlet channel 14. The preferred embodiment of a one inch check valve would have a 15 degree tapered angle 62 extending between a major outer diameter 64 of about 1.058 inches to the 1.000 inch diameter 66 of the inlet flow channel passage 24. The valve seat may also be formed by a molded insert (not shown) of P.T.F.E. or the like located in an undercut portion of the body between the chamber and inlet channel. With reference also to FIG. 2, the preferred valve head 26 for use with the valve seat 20 of the one inch valve shown in FIG. 3, would have a side wall radius of curvature 52 of about 0.553 inch extending between a major diameter 68 of about 1.060 inch and a minor diameter 70 of about 0.949 inch. The diameter 70 of the disk portion 54 would preferably be about 1.220 inches.

FIG. 4 is an exploded section view of the valve member 22. The components include a stem 28 which, in the disclosed embodiment, threadily engages a blind hold formed in the circular disk 54, both of which are preferable made from 316 stainless steel, as is the valve body. The stem may also be affixed to the disk by staking. The plunger nose is made of a P.T.F.E. molded shell 72 which is preferable made from thin Teflon (between 0.010-0.020 inch), further having a thickened, rearwardly projecting annular lip 74 and a radially projecting rim 76. A pre-formed silicone rubber button 78 having a hardness in the range of about 10-30 durometer, preferably about 20 durometer, is located within the cavity of the hollow shell 72 in intimate engagement with the front 48 and sidewalls 50 thereof. The mating surface 80 of the disk 54 is preferable sandblasted or etched, and the mating surface 82 of the silicone button 78 will be coated with a suitable adhesive for attachment to the disk during the final assembly of the plunger. Preferably, either one or both of the front portion 85 of the silicone button 78 and the inside surface of the "Teflon" shell is etched.

Preferably, the shell 72 is formed by heat molding a sheet of "Teflon" over the silicone button 78. The shell 72 is joined to the disk 54 by forcing the lip 74 into a circular groove 84 on the disk. Any excess material resulting from the molding of the shell into the disk can easily be trimmed. The disk outer diameter is then cold headed, crimping the lip 74 inside the groove 84, thus sealing the silicone button from contact with the fluid in the operating environment. Accordingly, the valve of the present invention is suitable for use in corrosive environments.

The construction of the valve member should be carefully controlled to maintain the dimensional relationships and plunger profile such that contact between the plunger and the valve seat occurs when the disk is between about 0.030 and 0.070 inch above the valve seat rim 56 (see FIG. 3). The initial line contact established at this elevation within the valve seat will seal against back flow at minimum back pressure because the back pressure is applied against a thin line contact thus creating more force against the seat over less area than if the contact were spread out over a large area as would occur with a frustoconical valve seat and complementary shaped plunger. The flexible nature of the silicone allows the plunger to seal even against minor imperfections in the seating area. As back pressure builds the plunger is forced down into the seat a short way until the overhanging disk contacts the rim 58 of the valve seat. This allows the check valve to withstand considerable pressure without deforming the plunger nose or "blowing through" the seat. To achieve the desired result, the relationship of the plunger radius, seat angle, seat thickness, and manufacturing tolerances must be controlled. Preferably, these dimensions and tolerances are taken with respect to the inlet channel diameter. Valve seat tolerance should be kept between plus or minus one degree, and preferably plus one-half degree minus zero degree, and the plunger radius tolerance should be maintained within about plus 0.0 minus 0.005 inch.

The composite valve plunger described above is preferably employed with the y-type valve body, wherein the chamber is oriented at an angle of between 45 and 60 degrees relative to the inlet channel, and the valve cap is removable to allow access to the seat area and to the plunger for cleaning or replacing components without disconnecting the inlet and outlet channels from the proces line.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method of forming a plunger for a valve comprising the steps of:
   providing a rigid metal disk with a front and back surface and a circular groove on said front surface;

forming a button from a material having a durometer rating in the range of 20-30, said button including front and back surfaces and a side wall extending therebetween, said front and back surfaces being generally parallel and coaxial and said front surface being smaller in area than said back surface;

forming a shell comprising a material having a low coefficient of friction around said button, said shell being in part complementary in shape to said button, being in intimate contact with the front surface and side wall of said button and having an annular lip; and isolating said button from the ambient environment by forcing said annular lip into said circular groove to thereby encapsulate said button between said shell and said disk; and attaching a stem to said back surface.

2. The method of claim 1 wherein the step of isolating said button includes compressing the disk to sealingly capture the lip in said circular groove.

3. The method of claim 1 wherein said button is adhesively joined to said disk.

4. The method of claim 3 wherein said button is adhesively joined to said disk and thereafter the shell material is hot molded over said button and secured to said disk.

* * * * *